United States Patent [19]
Trouve et al.

[11] Patent Number: 5,262,238
[45] Date of Patent: Nov. 16, 1993

[54] CATIONIC COPOLYMERS WHICH ARE INSOLUBLE IN WATER, NEW DISPENSIONS AND THEIR USE IN THE COATING OF PAPERS

[75] Inventors: Claude Trouve, Yerres; Michel Richard, L'Isle Adam; Paul Mallo, Chatou; Jean-Yves Anquetil, Saint Denis, all of France

[73] Assignee: Societe Francaise Hoechst, Puteaux, France

[21] Appl. No.: 987,809

[22] Filed: Dec. 9, 1992

[30] Foreign Application Priority Data

Dec. 9, 1991 [FR] France .................. 91 15221

[51] Int. Cl.$^5$ .................. C08L 33/24; C08L 33/16
[52] U.S. Cl. .................. 428/402; 524/801; 524/813; 524/815; 524/555; 526/292.2; 526/292.95; 162/135
[58] Field of Search ............ 524/801, 813, 815, 816; 428/402

[56] References Cited

U.S. PATENT DOCUMENTS

| | | | |
|---|---|---|---|
| 4,581,402 | 4/1986 | Dunk et al. | 524/317 |
| 4,677,152 | 6/1987 | Allen et al. | 524/543 |
| 5,075,399 | 12/1991 | Ahmed et al. | 526/287 |

FOREIGN PATENT DOCUMENTS

| | | |
|---|---|---|
| 0325065 | 7/1989 | European Pat. Off. . |
| 0419654 | 4/1991 | European Pat. Off. . |
| 0494554 | 7/1992 | European Pat. Off. . |

*Primary Examiner*—Joseph L. Schofer
*Assistant Examiner*—Mark Nagumo
*Attorney, Agent, or Firm*—Browdy and Neimark

[57] ABSTRACT

Cationic copolymers which are insoluble in water based on acrylamide, and a cationic monomer of general formula (I)

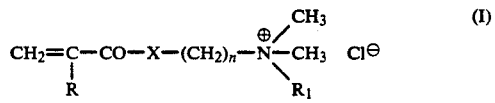

in which R and $R_1$, identical or different, represent a hydrogen atom or a methyl group, X represents an oxygen atom or an NH radical and n represents 2 or 3, containing in molar proportions 5 to 30% of cation units and cross-linked with 0.01% to 0.4% in molar proportions relative to the previous monomers of bisacrylamidoacetic acid and with about 0.01% to 0.1% in molar proportions relative to the monomers of bisacrylamidoacetic acid, self-reversible dispersions containing them and use in coating in the paper industry.

8 Claims, No Drawings

CATIONIC COPOLYMERS WHICH ARE INSOLUBLE IN WATER, NEW DISPENSIONS AND THEIR USE IN THE COATING OF PAPERS

The present invention relates to new cationic copolymers which are insoluble in water, new dispersions and their use in the coating of papers.

Cationic copolymers which are insoluble in water are described in the literature and in particular cross-linked copolymers based on acrylamide and dialkylaminoalkyl (meth)acrylate with 5 to 100 ppm relative to the weight of monomers employed which have thickening properties for certain household detergents and/or softeners (European Patent Application No. 422179).

In the paper industry, for certain uses, notably graphics and more notably for printing by photo-engraving, offset and flexographic processes, products are being sought which improve the smoothness of the paper whilst controlling its microporosity and its affinity for inks (with an organic solvent or with water) in order to achieve an optimum printing rendition (with regard to density, gloss, tint, smudging or strike-through). These products must not modify other important properties such as opacity, whiteness, water resistance.

It would be desirable to have available products which are compatible with a large number of coating colours. In order to resolve this problem, new cationic copolymers have now been discovered which are insoluble in water characterized by the fact that they are based on acrylamide, hereafter designated AAM, and a cationic monomer of general formula (I)

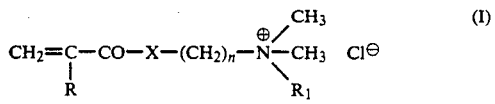

in which R and $R_1$ identical different represent hydrogen atom or a methyl group, X represents an oxygen atom or an NH radical and n represents 2 or 3, containing in molar proportions 5 to 30% of cation units and cross-linked with 0.01% to 0.4% in molar proportions relative to the aforementioned monomers of bisacrylamidoacetic acid, hereafter designated ABAA.

In particular a subject of the invention is the copolymers described above, characterized in that the said copolymers are cross-linked with about 0.01% to 0.1% in molar proportions relative to the monomers of ABAA.

More particularly a subject of the invention is the copolymers as defined above in which the monomer of general formula (I) is either dimethylaminoethyl acrylate salified with hydrochloric acid, hereafter designated CHA, or dimethylaminoethyl acrylate quaternized with methyl chloride, hereafter designated CMA, or diethylaminoethyl acrylate quaternized with methyl chloride, hereafter designated CME, or dimethylaminoethyl methacrylate quaternized with methyl chloride, hereafter designated CMM or finally methacrylamidopropyltrimethylammonium chloride, hereafter designated MAPTAC.

Advantageously, the cationic monomer is CMA. Among the copolymers based on CMA, in particular a subject of the present invention is those containing an AAM-CMA copolymer, with about 80-20 in molar proportions (namely, in particular 15 to 25 parts and more particularly 18 to 22 parts of CMA for 85 to 75, in particular 82 to 78 parts of AAM), preferably cross-linked with about 0.02% mole of ABAA (namely in particular from 0.015 to 0.025% mole ABAA).

The cationic copolymers defined above are insoluble in water but they are swellable with water. Due to this fact they are capable of easily absorbing several times their own weight of water and of releasing it just as easily when they are subjected, for example, to a strong shearing action or to drying.

Also a subject of the present invention is the compositions intended for the coating of paper containing, as active ingredient, one of the polymers defined previously.

These compositions are characterized by the fact that they are self-reversible dispersions, the average particle size of which is less than 20 μm, constituted hand by an aqueous phase, containing one of the polymers defined previously, dispersed in an oil phase, and by at least two emulsifying agents having an overall HLB value greater than 8 and of which at least one of these emulsifying agents has an HLB value of less than 5.

The oil phase of the dispersion is constituted for example by one or more hydrophobic hydrocarbons such as hexane, cyclohexane, straight or branched chain $C_8$–$C_{13}$ mineral oil cuts such as paraffin or paraffin/naphthenic oils in particular as regards commercial oils, those sold under the name Shell white mineral oil, Isopar ®, Solpar ® or Exxsol ®.

The dispersed aqueous phase preferably represents 30 to 75% of the total weight of the dispersion and it contains in suspension notably 20 to 45% by weight of a copolymer defined previously.

The emulsifying agent of HLB value of less than 5 is chosen from known emulsifying agents, which are soluble in oils, such as sorbitan monostearate, monooleate or sesquioleate, and it is advantageously contained in the dispersion in proportions of 2 to 8% by weight relative to the total weight of the dispersed aqueous phase.

The emulsifying agents present in the dispersion must have an overall HLB value greater than 8, therefore it is usually necessary to employ one or two emulsifying agents having an HLB value greater than 10, so as to compensate for the HLB value of less than 5 of at least one of the emulsifying agents. These emulsifying agents with an HLB value of greater than 10 are chosen from known hydrosoluble emulsifying agents, such as ethoxylated alkylphenols, sodium dialkylsulphosuccinates, soaps derived from $C_{10}$–$C_{22}$ fatty acids.

The copolymers defined previously and the aforementioned compositions containing them, which were unknown, can be prepared by methods which are similar to those described for the preparation of polymers and the known compositions containing them.

The copolymers defined previously and the aforementioned compositions can be prepared notably by radical-like polymerization in a water-in-oil emulsion. This type of polymerization is extensively described in the literature and it consists of preparing, in the presence of one or more emulsifiers soluble in oils, a water-in-oil emulsion the particle size of which is less than 20 μm and containing monomers in solution in the dispersed aqueous phase, then after careful deoxygenation of this emulsion, carrying out the polymerization reaction with an initiator using one or more free radical generators, then finally cooling down the dispersion obtained to ambient temperature after having introduced into it a sufficient quantity of hydrophilic surfactant(s), in order to make it self-reversible.

The starting water-in-oil emulsion is prepared using water-in-oil emulsifying agents known for this purpose such as sorbitan monostearate, monooleate, or sesquioleate. These emulsifying agents must have an HLB value of less than 5 and they are advantageously contained in the emulsion in proportions of 2 to 8% by weight relative to the total weight of the aqueous phase.

The oil phase of the emulsion is constituted for example by one or more hydrophobic hydrocarbons such as hexane, cyclohexane, straight or branched chain $C_8$–$C_{13}$ mineral oil cuts such as paraffin oils or paraffin/naphthenic oils marketed under the name of Shell white mineral oil, Isopar ®, Solparx ® or Exxsol ®.

The dispersed aqueous phase represents about 30 to 75% of the total weight of the emulsion and it contains in solution notably 20 to 45% by weight of monomers.

The polymerization reaction is initiated by one or more free radical generating agents such as redox pairs, such as the cumene hydroperoxide-sodium bisulphite pair, azoic compounds such as azo-bis 4,4' (cyano-4 pentanoic) acid, azo-bis amidinopropane hydrochloride.

The polymerization temperature depends on the polymerization initiator chosen and can vary within limits ranging from 5° C. to 100° C. for example, but in general the polymerization is carried out at normal pressure at temperatures of 10 to 80° C. Advantageously the polymerization is carried out in a quasi adiabatic manner, at ambient pressure.

At the end of polymerization, one or more emulsifying agents, the HLB value of which is generally greater than 10, are introduced into the dispersion obtained. They are essentially hydrophilic products such as ethoxylated alkylphenols, sodium dialkylsulphosuccinates, soaps deriving from $C_{10}$–$C_{22}$ fatty acids. Advantageously, ethoxylated nonylphenols with 6 to 12 moles of ethylene oxide are used. 1.5 to 8% by weight relative to the total Weight of the dispersion of one or more emulsifying agents are incorporated in the final dispersion, having an HLB value greater than 10 so that the overall HLB value of the emulsifying agents present in the dispersion is greater than 8.

The copolymers according to the present invention may be easily isolated from the dispersions containing them. For example, to do this the dispersion is diluted with the solvent used to prepare said copolymers such as cyclohexane or hexane, preferably one part by weight, then introduced slowly under agitation into 70 to 80 parts by weight of another solvent such as anhydrous acetone. After 30 minutes of agitation, the precipitate obtained is filtered, then washed in the latter solvent and finally dried under reduced pressure to a constant weight. In this way a quasi quantitative yield of a copolymer according to the invention is obtained in a solid state, in the form of micropearls which are insoluble in water.

The copolymers according to the present invention in particular when they are contained in a composition as described previously have excellent properties for conferring excellent smoothness to paper and/or cardboard supports.

For this use, the products according to the present invention are implemented very simply with standard coating devices such as those known under the names of "size-press", "size-tub", "calender sizing", etc., incorporating in the coating colour containing normal pigments and binders as well as optionally other standard additives, the necessary quantity of copolymer defined previously, in order to obtain the desired smoothness.

The copolymer is used in the form of the previously defined composition. As soon as it is incorporated in the aqueous coating colour containing the normal ingredients such as pigments, binders, at a dose of dry matter comprised between about 50 and 75% by weight, the composition containing the polymer defined previously reverses itself immediately while releasing into the coating colour the copolymer swollen with water but insoluble in water. The doses used expressed in grams of dry copolymer relative to the weight of dry paper support vary from 0.05 to 0.5%.

The copolymers and the compositions containing them according to the present invention permit the state of the surface of the paper supports obtained both with a chemical pulp (pulp without wood) and with a mechanical pulp (pulp with wood) to be considerably improved. In addition to improving the state of the surface and decreasing the roughness of the paper, particularly for papers derived from a mechanical pulp, the products according to the invention also permit the conditions for implementing coating to be improved, notably:

by suppressing strike-through of the paper by the coating colour with as a result the elimination of the bleaching of the backing-roll, by lubricating the blade: the machinability is improved with reduced risks of breakdown;

by improving the dynamic water retention on the coated paper: the water penetrates into the support more slowly than in standard processes, which brings about a more even coating, without mask or running, by providing coating colours that are compatible with products having a cationic character.

It has been noted that the improvement of the smoothness of a paper support was notably a function of the cross-linking rate of the copolymer used, therefore of the cross-linking agent. For a proportion of cross-linking agent of less than 0.01% molar relative to the monomers of bisacrylamidoacetic acid practically no improvement in the smoothness is obtained. Also starting with a proportion of cross-linking agent of greater than 0.4% molar of bisacrylamidoacetic acid, no further improvement in the smoothness is observed.

The following examples illustrate the present invention without however limiting it.

EXAMPLE 1

300 q of double distilled water, 6 q (28.5 mmole) of citric acid crystallized with one molecule of water, 0.5 g of a 40% by weight aqueous solution of the sodium salt of diethylene triaminopentaacetic acid, designated DTPANa, 160 g of a commercial aqueous solution with 76% by weight of CMA, that being 0.63 mole, 178.5 g (2.51 mole) of crystallized acrylamide, 0.124 (0.63 mmole) of ABAA dissolved extemporaneously in about 0.7 g of 1N soda and 45 mg of azobisacrylamidinopropane hydrochloride, currently designated ABAH, dissolved in the minimum amount of 0.1N soda are mixed together under agitation at ambient temperature. The total weight of this aqueous solution is then adjusted to 700 g with double distilled water and its pH is adjusted, if necessary, to 3.5 with a few drops of an aqueous solution of hydrochloric acid. An aqueous solution is obtained designated S.

Furthermore, 241 g of commercial paraffin-naphthenic oil having a boiling point of 300 to 350° C, hereafter designated H, and 21 g of sorbitan sesquioleate are mixed together under agitation at ambient temperature. Then the aforementioned aqueous solution S is introduced into this mixture over about 15 minutes under strong agitation while maintaining the temperature around +5° C. The dispersion obtained is subjected for about 1 minute to vigorous agitation with an Ultra-Turax type turbine so as to obtain a Brookfield viscosity of about 3700 mPa.s determined at 20° C. with a Brookfield RVT apparatus.

The emulsion thus obtained is transferred into a polymerization reactor, then it is carefully deoxygenated by bubbling nitrogen through it while maintaining the temperature below 10° C. Then, under agitation, 5 ml of a solution of 10 g of cumene hydroperoxide in one liter of the aforementioned oil H is introduced over 5 minutes, then 23 ml of a solution of 2.24 g of sodium metabisulphite in one liter of double distilled water is introduced over 25 minutes. The whole is left to allow the polymerization reaction to develop in a quasi adiabatic manner. Over about 25 minutes the reaction medium temperature increases 62° C., with an average gradient of 2 to 3° C. per minute. When the temperature of the reaction medium decreases it is heated and is kept at 80° C. under agitation for one hour, then it is cooled down to 50° C. At this temperature 10 g of nonylphenol ethoxylated with 10 moles of ethylene oxide and 10 g of nonylphenol ethoxylated with 12 moles of ethylene oxide are introduced then the reaction medium is cooled down to ambient temperature.

In this way about 1 kg of a water-in-oil emulsion is obtained containing in the dispersed aqueous phase a copolymer AAM-CMA, 80-20 in molar proportions, cross-linked with 0.02% in molar proportions of ABAA relative to the monomers used. The emulsion has a Brookfield viscosity of 710 mPa.s. determined at 20° C. and the isolated copolymer in suspension at 1% by weight in water has a Brookfield viscosity of 27400 mPa.s. and at 1% by weight in a 0.1% aqueous solution of sodium chloride a Brookfield viscosity of 1280 mPa.s.

EXAMPLE 2

Example 1 is reproduced using only 62 mg (0.315 mmole) of ABAA. In this way about 1 kg of a water-in-oil emulsion is obtained containing in the dispersed aqueous phase a copolymer AAM-CMA, 80-20 in molar proportions, cross-linked with 0.01% in molar proportions relative to the ABAA monomers used. The emulsion has a Brookfield viscosity of 1040 mPa.s determined at 20° C. and the isolated copolymer in suspension at 1% by weight in water has a Brookfield viscosity of 15900 mPa.s and at 1% by weight in a 0.1% aqueous solution of sodium chloride a Brookfield viscosity of 200 mPa.s.

EXAMPLES A1-A3 AND COMPARISON EXAMPLES C1-C3

In these examples, a paper support obtained, either with a chemical pulp, B1, or a mechanical pulp, B2, or a non-sized wood pulp, B3, is treated with a coating color the composition of which in dry material, expressed in g, is given in Table I, on a Helicoater MK IV type from the Charlestown Engineering Company. The weight of the deposit, as well as the pH and the viscosity of the coating colour are also mentioned in Table I. The coated paper is then subjected to drying under infrared at 36 Kwh of power for 120 seconds, then its smoothness is determined with a BEKK measuring device according to French Standard NF Q 03-012 of February 1974 and the results are expressed in seconds. The smoothness is better the longer the time.

The BEKK porosity which determines the permeability to air of a paper is measured with the same device which allows the BEKK smoothness to be known by replacing the flat die with a die carrying concentric grooves. With this device, the time required for 100 $cm^3$ of air to cross 1 $cm^2$ of sample under a low pressure of 380 mbar is determined, and the result is expressed in seconds. In order to improve the accuracy of this measurement, measurements are taken on several identical superimposed samples and the result is expressed by dividing the measured time by the number of samples.

In Table I, the weights are expressed in grams and the viscosities, determined on a Brookfield RVT apparatus at 20° C, at the speed and with the axis recommended for the value indicated, are expressed in mPa.s. The rheology modifiers of the coating colour are either the products described in the examples, or carboxymethylcellulose, designated CMC, marketed by the Assignee under the reference TYLOSE ® VCLL, and which is currently the most used rheology modifier. The binder L1 is a binder currently used in paper coating and it is a latex SBR marketed by the Company Dow France under the reference DL 675 SBR. The pH of the coating colour is adjusted to the value indicated with 10% soda. The angle of the blade of the coating apparatus is expressed in degrees.

The viscosity and the pH of the coating colors of these two examples are stable over time and they have no applicability problems: the blade pressures used are approximately the same.

From examination of Table I it can be noted that by using kaolin as the pigment, the composition according to the present invention gives a BEKK smoothness 76% greater than that given by CMC. Consequently this gain allows a saving of deposit of at least 1 g/$m^2$, i.e. a saving of 17%. Similarly, TABER test, standard TAPPI T 476 pm76, which determines the resistance of the paper to moist abrasion, it is noted that the product according to the invention gives an average turbidity value expressed in Ntu of 153 against 178 for the CMC, which shows that the composition according to the present invention gives the treated paper better resistance to dampness.

With the use of calcium carbonate as the pigment, the composition according to the present invention considerably improves the smoothness (−95%) and the porosity (−33%). In addition, the composition of the present invention was tested in a Heliotest which allows the behavior of papers during printing with photo-engraving to be simulated with a high degree of precision.

With the formulations given in Examples A3 and C3 (cf. Table I) and with a deposit of 8.6 to 8.9 g/$m^2$ the distance to the twentieth missing point moves from 3 mm (Example C3) to 30 mm (Example A3) which constitutes a remarkable performance.

The Heliotest consists of carrying out printing of a calendered paper with a copper cylinder the surface of which is engraved with square or round cells. The depth of the cells is greater (a maximum of 3 to 4 tenths of a millimeter) the darker the chosen printing is. The lower part of the cylinder bathes in the ink, the excess ink entrained is then eliminated with a bevelled scraper and finally the cylinder transfers the residual ink to the paper under high pressure applied using a rubber cylinder pressing the paper onto the engraved copper cylinder. The test is carried out at a constant speed of 1 m/s on a calendered paper. The results are expressed by determining the distance to the twentieth missing point using a given quantity of ink (3 to 4 drops only).

TABLE I

| | | Ex C1 | EX A1 | EX C2 | EX A2 | EX C3 | EX A3 |
|---|---|---|---|---|---|---|---|
| Formulation of the coating mass | | | | | | | |
| Pigment calcium carbonate | | 0 | 0 | 100 | 100 | 100 | 100 |
| kaolin | | 100 | 100 | 0 | 0 | 0 | 0 |
| talc | | 0 | 0 | 0 | | | |
| Binder | | | | | | | |
| nature | | L1 | L1 | L1 | L1 | L1 | L1 |
| weight | | 12 | 12 | 12 | 12 | 12 | 12 |
| Rheology modifier | | | | | | | |
| nature | | CMC | EX 1 | CMC | EX 2 | CMC | Ex 1 |
| weight expressed in dry state | | 1 | 1.3 | 1 | 0.7 | 1 | 1.7 |
| Dry extract | in % by weight | 59.0 | 59.0 | 61.5 | 61.5 | 61.5 | 61.5 |
| viscosity | mPa.s | 390 | 1210 | | | | |
| pH | | 8 | 8 | 9 | 9 | 9 | 9 |
| Support | | | | | | | |
| nature | | B3 | B3 | B3 | B3 | B3 | B3 |
| basis weight g/m² | | 39 | 39 | 39 | 39 | 39 | 39 |
| Operating conditions | | | | | | | |
| speed | m/min | 600 | 600 | 600 | 600 | 600 | 600 |
| angle of the blade | in degrees | 59 | 59 | 59 | 59 | 59 | 59 |
| thickness of blade | mm | 0.508 | 0.508 | 0.508 | 0.508 | 0.508 | 0.508 |
| Results | | | | | | | |
| deposit | g/m² | 8 | 8 | 8 | 8 | 8 | 8 |
| BEKK smoothness | seconds | 44.0 | 57.2 | 30.8 | 73.7 | 27 | 52.5 |
| BEKK porosity | seconds | 42 | 29 | 21 | 14 | 27.9 | 18.4 |
| TABER turbidity | Ntu | 32 | 9 | 102 | 294 | 105 | 159 |
| Deposit | g/m² | 8 | 8 | 8 | 8 | 8 | 8 |

What is claimed is:

1. A self-reversible dispersion the average particle size of which is less than 20 μm, comprising an aqueous phase dispersed in an oil phase and at least two emulsifying agents having an overall HLB value greater than 8 and of which at least one of these agents has an HLB value of less than 5, wherein said dispersion contains in the aqueous phase at least one water-insoluble and water-swellable cationic copolymer of the formula

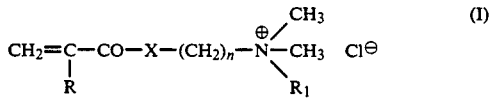

(I)

in which R and $R_1$, identical or different, represent a hydrogen atom or a methyl group, X represents an oxygen atom or an NH radical and n represents the number 2 or 3, containing in molar proportions 5 to 30% of cation units and cross-linked with 0.01% to 0.4%, in molar proportions relative to said monomers, of bisacrylamidoacetic acid.

2. Dispersion according to claim 1, wherein said dispersion contains by weight in suspension in the dispersed aqueous phase from 20 to 45% of said cationic copolymer.

3. Dispersion according to claim 2, wherein the dispersed aqueous phase represents 30 to 75% of the total weight of the dispersion, and the quantity of bisacrylamidoacetic acid used to cross-link said monomers is 0.01% to 0.1% in molar proportions.

4. Dispersion according to claim 3, obtained by a process consisting of preparing, in the presence of one or more emulsifying agents soluble in oils, a water-in-oil emulsion the particles of which have a size of less than 20 μm and containing monomers in solution in the dispersed aqueous phase, then after careful deoxygenation of this emulsion, of carrying out the polymerization reaction with an initiator comprising one or more free radical generators, then finally of cooling down the dispersion obtained to ambient temperature after having introduced into it a sufficient quantity of emulsifying agents to render it self-reversible.

5. Dispersion according to claim 2, obtained by a process consisting of preparing, in the presence of one or more emulsifying agents soluble in oils, a water-in-oil emulsion the particles of which have a size of less than 20 μm and containing monomers in solution in the dispersed aqueous phase, then after careful deoxygenation of this emulsion, of carrying out the polymerization reaction with an initiator comprising one or more free radical generators, then finally of cooling down the dispersion obtained to ambient temperature after having introduced into it a sufficient quantity of emulsifying agents to render it self-reversible.

6. Dispersion according to claim 1 wherein the dispersed aqueous phase represents 30 to 75% of the total weight of the dispersion.

7. Dispersion according to claim 6, obtained by a process consisting of preparing, in the presence of one or more emulsifying agents soluble in oils, a water-in-oil emulsion the particles of which have a size of less than 20 μm and containing monomers in solution in the dispersed aqueous phase, then after careful deoxygenation of this emulsion, of carrying out the polymerization reaction with an initiator comprising one or more free radicals generators, then finally of cooling down the dispersion obtained to ambient temperature after having introduced into it a sufficient quantity of emulsifying agents to render it self-reversible.

8. Dispersion according to claim 1 that is obtained by a process consisting of preparing, in the presence of one or more emulsifying agents soluble in oils, a water-in-oil emulsion the particles of which have a size of less than 20 μm and containing monomers in solution in the dispersed aqueous phase, then after careful deoxygenation of this emulsion, of carrying out the polymerization reaction with an initiator comprising one or more free radical generators, then finally of cooling down the dispersion obtained to ambient temperature after having introduced into it a sufficient quantity of emulsifying agents to render it self-reversible.

* * * * *